United States Patent
Ito

(10) Patent No.: US 8,533,730 B2
(45) Date of Patent: Sep. 10, 2013

(54) STREAM DATA PROCESSING METHOD, STREAM DATA PROCESSING PROGRAM AND STREAM DATA PROCESSING APPARATUS FOR RUNTIME QUERY GROUP DATA STAGNATION DETECTION AND LOAD BALANCING

(75) Inventor: Shinichi Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 12/627,726

(22) Filed: Nov. 30, 2009

(65) Prior Publication Data

US 2010/0229178 A1   Sep. 9, 2010

(30) Foreign Application Priority Data

Mar. 3, 2009   (JP) ................. 2009-048792

(51) Int. Cl.
*G06F 9/46* (2006.01)
*G06F 3/00* (2006.01)

(52) U.S. Cl.
USPC .............. 718/105; 718/104; 710/29; 707/713

(58) Field of Classification Search
USPC ................................. 718/104, 105; 710/29
See application file for complete search history.

(56) References Cited

U.S. PATENT DOCUMENTS

| 6,820,135 B1* | 11/2004 | Dingman et al. ............. 709/246 |
|---|---|---|
| 7,010,538 B1* | 3/2006 | Black ............................ 707/636 |
| 2003/0118127 A1* | 6/2003 | Peting ........................... 375/316 |
| 2006/0277230 A1 | 12/2006 | Nishizawa et al. |
| 2007/0088828 A1* | 4/2007 | Inampudi et al. ............ 709/226 |
| 2007/0250365 A1* | 10/2007 | Chakrabarti et al. ............ 705/8 |
| 2007/0299980 A1* | 12/2007 | Amini et al. ................... 709/231 |
| 2008/0114787 A1* | 5/2008 | Kashiyama et al. .......... 707/100 |
| 2008/0184211 A1* | 7/2008 | Nickolls et al. ............... 717/140 |
| 2009/0070773 A1* | 3/2009 | Depoutovitch et al. ....... 718/106 |
| 2009/0248754 A1* | 10/2009 | Lipton et al. ................... 707/202 |

FOREIGN PATENT DOCUMENTS

| JP | 2003-298661 A | 10/2003 |
|---|---|---|
| JP | 2006-338432 A | 12/2006 |

OTHER PUBLICATIONS

Blumofe et al., "Adaptive and Reliable Parallel Computing on Networks of Workstations," Jan. 6, 1997, Proceedings of the USENIX 1997 Annual Technical Conference on UNIX and Advanced Computing Systems.*

R. Motwani et al., "Query Processing, Resource Management, and Approximation in a Data Stream Management System", Proceedings of the 2003 CIDR Conference, pp. 1-12, 2003.

* cited by examiner

*Primary Examiner* — Lewis A Bullock, Jr.
*Assistant Examiner* — Kevin X Lu
(74) *Attorney, Agent, or Firm* — Foley & Lardner LLP

(57) ABSTRACT

Once data stagnation occurs in a query group which groups queries, a scheduler of a server apparatus calculates an estimated load value of each query forming the query group based on at least one of input flow rate information and latency information of the query. The scheduler divides the queries of the query group into a plurality query groups so that the sum of estimated load values of queries belonging to one query group becomes substantially equal to the sum of estimated load values of queries belonging to another query group. The divided query groups are reallocated to different processors respectively. Throughput in query processing of stream data in a stream data processing system can be improved.

5 Claims, 10 Drawing Sheets

FIG.3
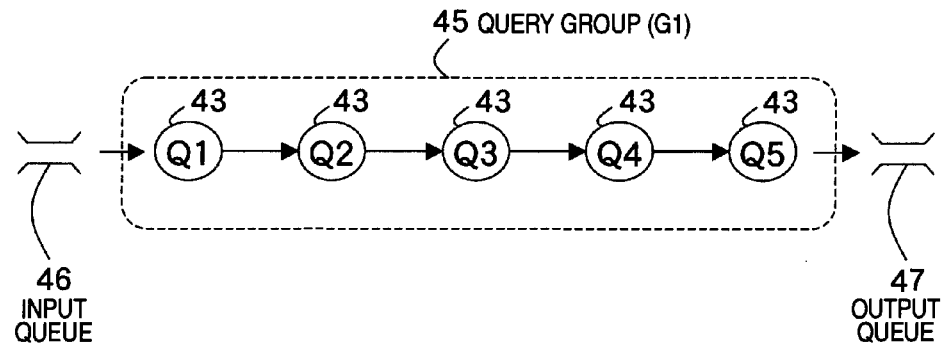
(a) BEFORE DIVISION OF QUERY GROUP
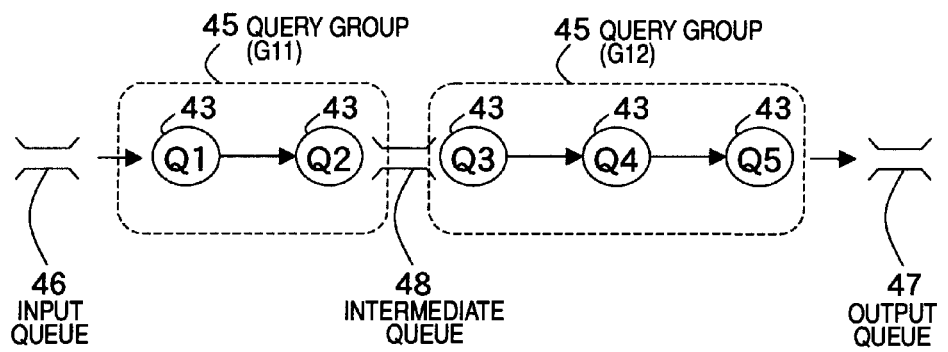
(b) RESULT OF DIVISION OF QUERY GROUP (FIRST DIVISION)
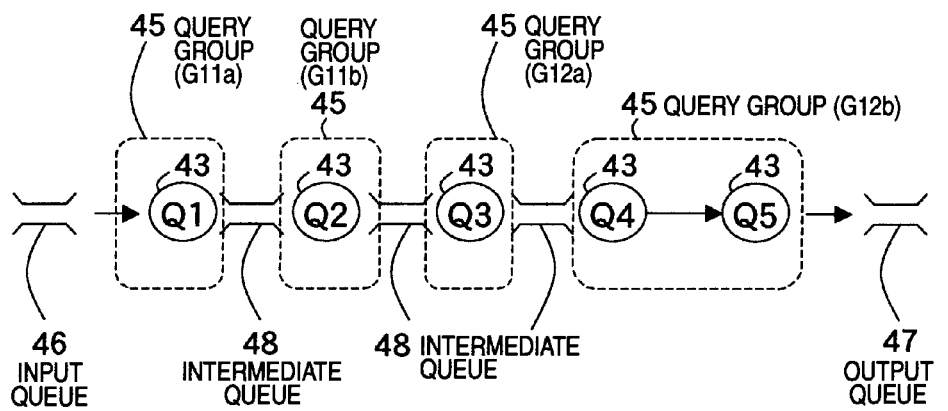
(c) RESULT OF DIVISION OF QUERY GROUP (SECOND DIVISION)

FIG.4

(a) BEFORE DIVISION OF QUERY GROUP

37 QUERY GROUP MANAGEMENT TABLE

| QUERY GROUP | QUERY | THREAD |
|---|---|---|
| G1 | Q1→Q2→Q3→Q4→Q5 | 1 |

(b) RESULT OF DIVISION OF QUERY GROUP (FIRST DIVISION)

37 QUERY GROUP MANAGEMENT TABLE

| QUERY GROUP | QUERY | THREAD |
|---|---|---|
| G11 | Q1→Q2 | 1 |
| G12 | Q3→Q4→Q5 | 2 |

(c) RESULT OF DIVISION OF QUERY GROUP (SECOND DIVISION)

37 QUERY GROUP MANAGEMENT TABLE

| QUERY GROUP | QUERY | THREAD |
|---|---|---|
| G11a | Q1 | 1 |
| G11b | Q2 | 3 |
| G12a | Q3 | 2 |
| G12b | Q4→Q5 | 4 |

FIG.6

(a) BEFORE DATA STAGNATION

38

| QUERY | INPUT FLOW RATE | LATENCY | ESTIMATED LOAD VALUE |
|---|---|---|---|
| Q1 | 40 | 10 | 400 |
| Q2 | 30 | 8 | 240 |
| Q3 | 30 | 16 | 480 |
| Q4 | 25 | 4 | 100 |
| Q5 | 20 | 2 | 40 |

(b) DURING DATA STAGNATION

38

| QUERY | INPUT FLOW RATE | LATENCY | ESTIMATED LOAD VALUE |
|---|---|---|---|
| Q1 | 80 | 10 | 800 |
| Q2 | 70 | 8 | 560 |
| Q3 | 70 | 16 | 1120 |
| Q4 | 65 | 4 | 260 |
| Q5 | 60 | 2 | 120 |

STREAM DATA PROCESSING METHOD, STREAM DATA PROCESSING PROGRAM AND STREAM DATA PROCESSING APPARATUS FOR RUNTIME QUERY GROUP DATA STAGNATION DETECTION AND LOAD BALANCING

BACKGROUND OF THE INVENTION

1. Field of the Invention

The present invention relates to techniques of a stream data processing method, a stream data processing program and a stream data processing apparatus.

2. Description of the Background Art

In the background art, a database management system (hereinafter referred to as "DBMS") is positioned at the heart of data management of a corporate information system. In the DBMS, data to be processed are stored in a storage, and highly reliable processing as typified by transaction processing is carried out on the stored data. On the other hand, there has been a growing request for a data processing system for real-time processing of a large volume of data arriving from moment to moment. When, for example, financial applications for aiding stock trading are taken into consideration, how quickly the system can react to stock price fluctuation is one of the most important issues for the system.

In a system like the background-art DBMS, stock data are once stored in a storage and retrieval is performed on the stored data. Such a system may lose business chances because processing for storing data and retrieving data cannot catch up with the speed of stock price fluctuation. Any approach to creation of individual real-time applications using a programming language as typified by Java (registered trademark) has problems such as lengthening of the development period, considerable rise of the development cost, and difficulty in quickly dealing with variations of business using the applications. Thus, a general-purpose real-time data processing mechanism has been requested. Stream data processing systems disclosed in JP-A-2003-298661, JP-A-2006-338432 etc. have been proposed as data processing systems suitable for such real-time data processing.

R. Motwani, J. Widom, A. Arasu, B. Babcock, S. Babu, M. Datar, G. Manku, C. Olston, J. Rosenstein, and R. Varma in "Query Processing, Resource Management, and Approximation in a Data Stream Management System", section 2 (Query Language), In Proc. of the 2003 Conf. on Innovative Data Systems Research (CIDR), January 2003, have disclosed a stream data processing system STREAM. In the stream data processing system, unlike the background-art DBMS, queries are first registered in the system, and the queries are executed continuously as data arrives. Here, stream data does not mean a logically continuous large steam of data such as a video stream, but means a large volume of time-series data consisting of comparatively small and logically independent streams, such as stock price distribution data in a financial application, POS data in retail business, probe-car data in a traffic information system, error log data in computer system management, sensing data generated from a ubiquitous device such as a sensor or an RFID.

Stream data keeps on arriving at the system. The stream data cannot be processed in real time if processing is started after the termination of arrival of the data. In addition, the data arriving at the system must be processed in order of their arrival without being affected by loads of data processing. In the system STREAM, a concept called a sliding window (hereinafter referred to as "window") is introduced in order to cut stream data continuously arriving at the system into parts designated as a time width such as latest 10 minutes or a width of the number of pieces of data such as latest 1,000 pieces, and process each of the cut parts in real time.

The document "Query Processing, Resource Management, and Approximation in a Data Stream Management System" has disclosed a CQL (Continuous Query Language) as a preferred example of a description language of queries including window specifications. In the CQL, parentheses are used following a stream name in a FROM expression of an SQL (Structured Query Language) widely used in the DBMS so as to give an extension to specify a window.

Not staticized data such as a table or the like handled in the background-art DBMS but seamless stream data cannot be processed if no window is specified for specifying which part of the stream data to be processed. A part of the stream data cut out by the window is held on a memory and used for query processing.

As typical window specifying methods, there are a Range window for specifying the width of a window by time, and a Row window for specifying the width of a window by the number of pieces of data. For example, when [Range 10 minutes] is set using the Range window, latest 10 minutes of data are set as a target of query processing. When [Rows 10] is set using the Row window, latest 10 pieces of data are set as a target of query processing.

Stream data to be dealt with in the stream data processing system includes a group of data arriving seamlessly from moment to moment. If the speed with which the stream data processing system carries out query processing upon one piece of data is lower than the speed of data arriving per unit time, the stream data processing system cannot process the arriving data completely. Query processing with a high load becomes a bottleneck, causing stagnation of data around the query processing. Once such data stagnation occurs even at one place, the throughput of the system as a whole will deteriorate.

SUMMARY OF THE INVENTION

Therefore, to solve the foregoing problem, a main object of the invention is to improve the throughput of a stream data processing system as to query processing on stream data.

In order to attain the main object, the invention provides a stream data processing method carried out by a stream data processing apparatus for accepting stream data inputted continuously and executing query arithmetic processing on the stream data, wherein:

the stream data processing apparatus includes a storage for storing the stream data, a stream control section for controlling the stream data processing apparatus, a query execution section for executing the query arithmetic processing on the stream data, and a scheduler for allocating computer resources of the stream data processing apparatus;

the scheduler groups one or more queries defining the query arithmetic processing as a query group and allocates the query group as one unit to a thread of the computer resources to make the query execution section execute the query arithmetic processing on the query group;

once data stagnation occurs in a given query group, the scheduler reads at least one of input flow rate information and latency information of each query of the given query group from the storage, and calculates an estimated load value of the query;

the scheduler divides queries belonging to the given query group into a plurality of query groups so that the sum of estimated load values of queries of one query group can be substantially equalized to the sum of estimated load values of queries of another query group; and the scheduler gives an instruction to the stream control section to reallocate the plurality of divided query groups to different threads of the computer resources respectively.

The other means will be described later.

According to the invention, the throughput of the stream data processing system can be improved as to query processing on stream data.

BRIEF DESCRIPTION OF THE DRAWINGS

FIG. 3 is explanatory diagram showing processing for dividing a query group according to the embodiment of the invention;

FIG. 4 is explanatory diagram showing registered information in a query group management table according to the embodiment of the invention;

FIG. 6 is configuration diagram showing a statistical information table according to the embodiment of the invention;

DETAILED DESCRIPTION OF THE INVENTION

An embodiment of the present invention will be described below with reference to the drawings.

Figure 1:
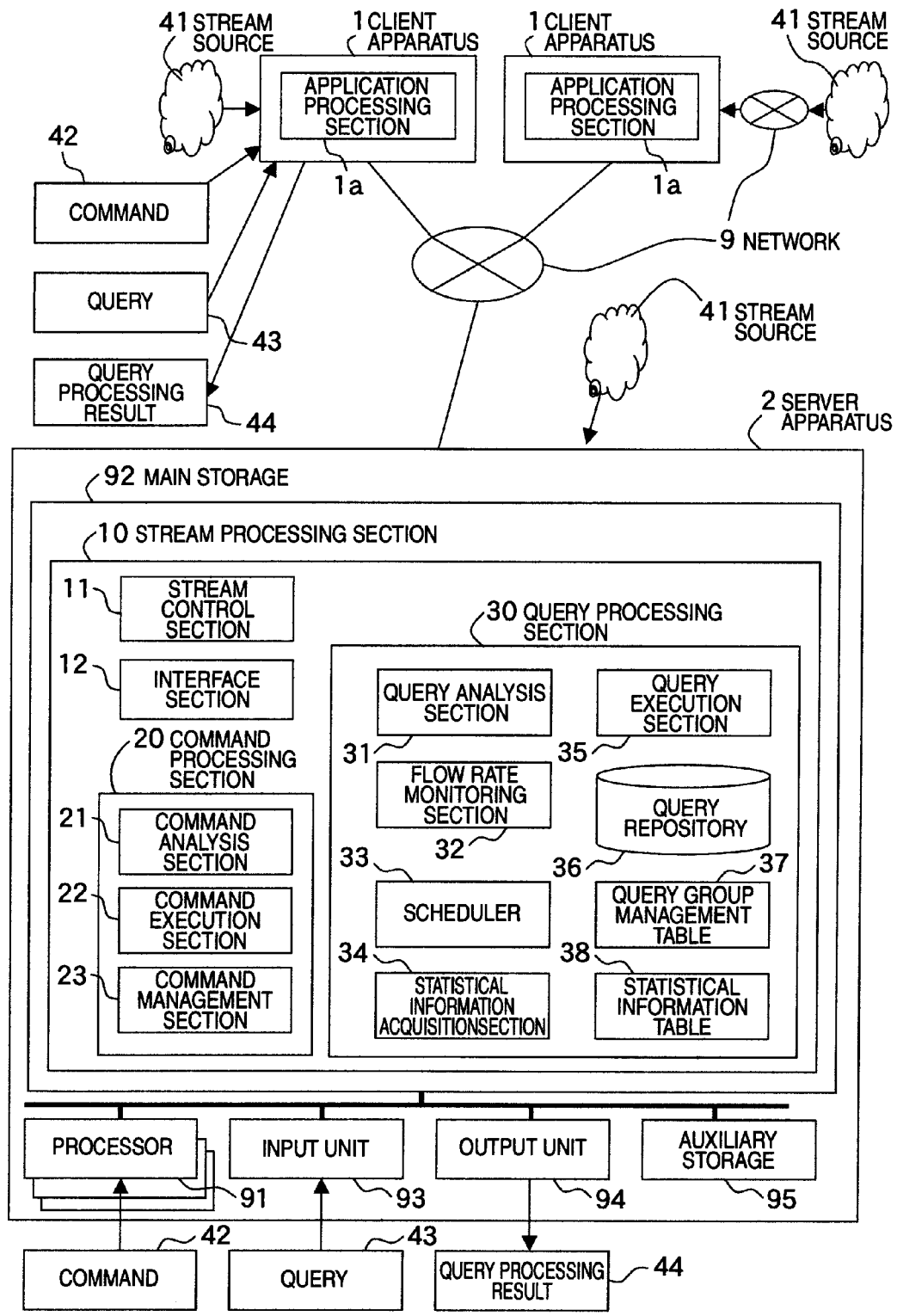
FIG. 1 is a configuration diagram showing a stream data processing system according to an embodiment of the invention.

FIG. 1 is a configuration diagram showing a stream data processing system according to this embodiment. The stream data processing system is constituted by at least one client apparatus 1, a server apparatus 2 and at least one stream source 41, which are connected through a network 9. The network 9 may be a local area network (LAN) connected through Ethernet (registered trademark), optical fibers or the like, or a wide area network (WAN) including the Internet with a lower speed than the LAN.

The stream source 41 is an information source which distributes (outputs) a large volume of stream data from moment to moment. Preferred examples of the stream data include stock price distribution information in a financial application, POS data in retail business, probe-car information in a traffic information system, error log data in computer system management, etc.

An example of the stream data distributed from the stream source 41 will be shown. Stream data "S1" forms one tuple out of three integer type variables (a, b, c) and one floating-point type variable (x). The stream data "S1" is defined as follows.

register stream S1
(a int, b int, c int, x float)

The client apparatus 1 is arranged as a desired computer system such as a personal computer or a blade computer system. The client apparatus 1 has an application processing section 1a. The application processing section 1a receives a command 42 and a query 43, executes an application and outputs a result thereof as a query processing result 44.

The server apparatus 2 is a computer having at least one processor 91, a main storage 92, an input unit 93, an output unit 94, and an auxiliary storage 95. The server apparatus 2 is arranged as a desired computer system such as a blade computer system or a PC server.

The processor 91 may be arranged as hardware with multi-cores, or as hardware supporting multi-threads. An OS for activating such hardware is operated by the processor 91. That is, the server apparatus 2 is mounted with computer resources for allocating a plurality of threads.

The threads are execution units to execute any program by use of a CPU.

The stream processing section 10 is expanded on the main storage 92 to act in cooperation with each element constituting the server apparatus 2. The stream processing section 10 is controlled by the stream control section 11. Further, the stream processing section 10 is configured to include an interface section 12, a command processing section 20 and a query processing section 30.

JP-A-2006-338432 has disclosed a preferred method for implementing a part of the stream processing section 10. For example, JP-A-2006-338432 has disclosed a detailed procedure of query registration, a method and a form for storing data inside a stream data processing system, a method of analyzing each query after accepting the query, a method of optimizing the query, a method of registering the query in the system, a method for registering streams in the stream data processing system, and a method for holding data in the system.

The interface section 12 is an interface for relaying data between each piece of hardware (such as a not-shown communication interface or the like for connection with the input unit 93, the output unit 94 and the network 9) of the server apparatus 2 and the stream processing section 10 of the server apparatus 2. For example, the interface section 12 sends a stream source 41 inputted through the input unit 93, to the query processing section 30.

The command processing section 20 is configured to include a command analysis section 21, a command execution section 22 and a command management section 23.

The command analysis section 21 parses a command 42.

The command 42 is control information inputted to the stream control section 11 and for controlling the stream processing section 10. The command 42 may be supplied from the input unit 93 of the server apparatus 2 or may be inputted to the client apparatus 1 and then received by the server apparatus 2 through the network 9.

By the command execution section 22, the command 42 analyzed by the command analysis section 21 is registered in the command management section 23.

The query processing section 30 is configured to include a query analysis section 31, a flow rate monitoring section 32, a scheduler 33, a statistical information acquisition section 34, a query execution section 35, a query repository 36, a query group management table 37 and a statistical information table 38.

The query analysis section 31 parses a query 43, optimizes the query 43, converts the query 43 into an execute form, and stores the query 43 into the query repository 36.

The query 43 may be supplied from the input unit 93 of the server apparatus 2 or may be inputted to the client apparatus 1 and then received by the server apparatus 2 through the network 9.

Figure 2:
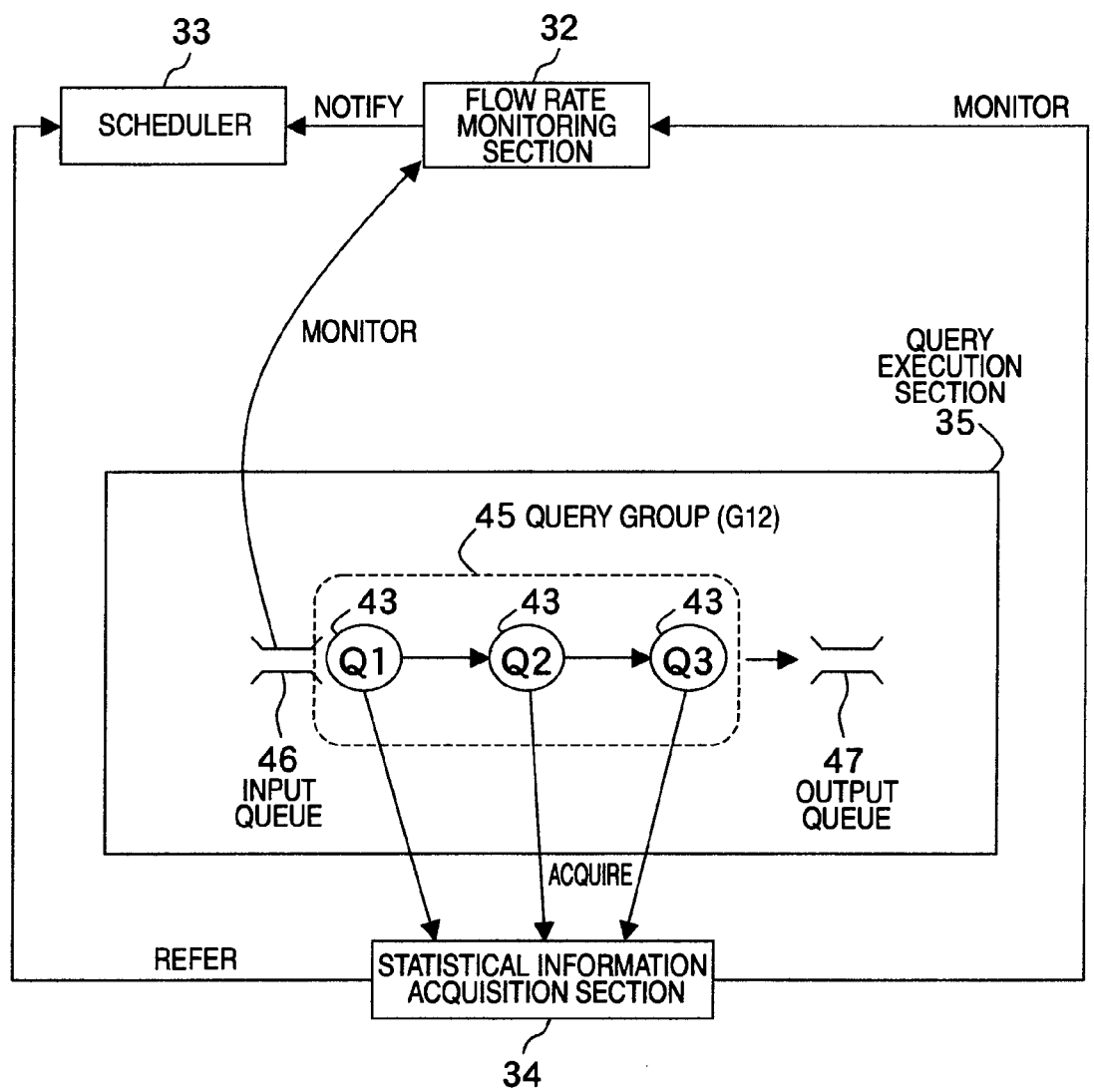
FIG. 2 is an explanatory diagram showing details of a query processing section according to the embodiment of the invention.

FIG. 2 is an explanatory diagram showing details of the query processing section 30.

The flow rate monitoring section 32 monitors an event that stream data to be processed by the query execution section 35 is stagnated inside or outside query arithmetic processing of the query execution section 35. Specifically, the flow rate monitoring section 32 refers to information on the statistical information table 38 in order to detect stagnation of data inside the query arithmetic processing, and refers to the use states of queues (an input queue 46 and an intermediate queue 48 which will be described later) in the query execution section 35 in order to detect data stagnation outside the query arithmetic processing. The flow rate monitoring section 32 informs the scheduler 33 of data stagnation when the flow rate monitoring section 32 detects the data stagnation.

The scheduler 33 arranges a set of queries 43 as a query group 45 and allocates the query group 45 as one unit to a thread. The scheduler 33 writes a result of arrangement of the query group 45 into the query group management table 37. Further, when the scheduler 33 receives a notification of data stagnation from the flow rate monitoring section 32, the scheduler 33 refers to the statistical information acquisition section 34 and divides one query group 45, whose data is stagnated, into two query groups 45. The scheduler 33 allocates the two divided query groups 45 to different threads respectively.

The statistical information acquisition section 34 acquires statistical information about execution of each query 43 from the query execution section 35, and writes the statistical information into the statistical information table 38 (see FIGS. 6A and 6B).

The query execution section 35 executes query arithmetic processing indicated by the query 43 upon stream data inputted from the stream source 41. The query execution section 35 outputs a result of the query arithmetic processing as a query processing result 44. The query processing result 44 is supplied to the output unit 94 through the interface section 12, and outputted therefrom. Alternatively, the query processing result 44 may be supplied to the client apparatus 1 via the network 9 and outputted from the application processing section 1a on the client apparatus 1. Here, the query execution section 35 is formed out of a plurality of threads, and each thread executes query arithmetic processing indicated by each query 43 belonging to the query group 45 allocated to the thread. The threads are connected to one another in series, and parallel processing is carried out by pipeline processing among the threads.

Queries 43 (Q1→Q2→*Q3) are loaded onto the query execution section 35 from the query repository 36. An input queue 46 is connected in front of the queries 43, and an output queue 47 is connected at the rear of the queries 43.

The input queue 46 stores stream data inputted through the interface section 12.

The queries 43 (Q1→4Q2→Q3) indicate the contents of processing for processing, in order of Q1→Q2→Q3, the stream data inputted to the input queue 46.

The output queue 47 stores a result of processing of the queries 43 (Q3).

The query repository 36 stores the inputted queries 43. The query repository 36 may be disposed in the main storage 92 on the server apparatus 2, or may be disposed in the auxiliary storage 95.

FIGS. 3A-3C are explanatory diagrams showing processing for dividing the query group 45. The query group 45 is divided into a plurality of query groups 45. The query groups 45 are allocated to different threads respectively, and executed in parallel. Thus, the query groups 45 can be processed in parallel so that the throughput can be improved.

FIGS. 4A-4C show information registered in the query group management table 37 showing the query groups 45 shown in FIGS. 3A-3C. FIGS. 3A-3C correspond to FIGS. 4A-4C respectively.

The processing for dividing the query group 45 will be described below with reference to FIGS. 3A-3C and 4A-4C.

First, FIGS. 3A-3C and 4A-4C show five queries (Q1→Q2→Q3→Q4→Q5) as queries 43 by way of example. These queries are connected in series so that a result of execution of the preceding one of the queries is inputted to the next one.

The query Q1 shows that a data stream S1 is inputted, the latest 10 pieces of input data defined by a window frame [rows 10] are set as a target of processing, and ones meeting a condition designated by the following "where" expression are outputted.

register query Q1
select S1.$a$, S1.$b$, S1.$x$ from S1 [rows 10] where S1.$a$>0

In the query Q2, an output result of the query Q1 is inputted, and an aggregate operation avg is carried out according to the following "groupby" expression.

register query Q2
select Q1.$a$, Q1.$b$, avg(Q1.$x$) from Q1 groupby Q1.$a$, Q1.$b$ The query Q3 is defined as follows:
register query Q3
select Q1.$a$, Q1.$x$ from Q2
where Q1.$x$>Q1.$a$ and Q1.x<Q1.$b$ The query Q4 is defined as follows:
register query Q4
select max(Q3.$x$) from Q3

The query Q5 is defined as follows:
register query Q5
instream (select * from Q4 where S1.$x$>1000)

First, as shown in FIG. 3A, in the state where the query group has not been divided, the five queries 43 are collected in one query group 45 (G1), and a thread (1) is assigned to the query group 45 (G1).

The query group management table 37 shown in FIG. 4A manages the query group 45, the queries 43 forming the query group 45, and the thread assigned to the query group 45 while the query group 45, the queries 43 and the thread are associated with one another.

Tuples of inputted stream data are first stored in an input queue 46. The head query 43 (Q1) of the query group 45 (G1) reads the tuples sequentially from the input queue 46, and executes query arithmetic processing thereon. The query 43 (Q1) delivers a result of the execution to the next query 43 (Q2). Then, the tail query 43 (Q5) of the query group 45 (G1) outputs a result of execution on a tuple inputted from the query 43 (Q4), to an output queue 47.

Next, as shown in FIG. 3B, in a first division state which is generated from the state of FIG. 3A, the query group 45 (G1) including the five queries 43 (Q1→Q2→Q3→Q4→Q5) is divided into a query group 45 (G11) including the queries 43 (Q1→Q2) and a query group 45 (G12) including the queries 43 (Q3→Q4→Q5). An intermediate queue 48 is provided between the two divided query groups 45 (G11 and G12) so as to deliver data between the query groups 45. Further, different threads are assigned to the two divided query groups 45 (G11 and G12) so that parallel processing is carried out between the two query groups 45. Thus, the throughput is improved.

Next, as shown in FIG. 3C, in a second division state derived from the state of FIG. 3A (that is, a division state generated from the state of FIG. 3B), the query group 45 (G11) is divided into a query group 45 (G11a) and a query group 45 (G11b). Further, the query group 45 (G12) is divided into a query group 45 (G12a) and a query group 45 (G12b). In the same manner as in FIG. 3B, intermediate queues 48 are provided to deliver data among the query groups 45. Thus, a total of four query groups 45 are created, and one thread is assigned to each query group 45 (that is, a total of four threads are assigned).

As described above with reference to FIGS. 3A-3C and 4A-4C, the processing for dividing the query group 45 is executed by the scheduler 33. The scheduler 33 executes the dividing processing, for example, as triggered by detection of increase in the load of the query group 45 to be divided. The scheduler 33 executes the dividing processing so that the load (processing time) of queries 43 belonging to one query group 45 obtained by the dividing processing is substantially equal to that of queries 43 belonging to another query group 45.

Figure 5:
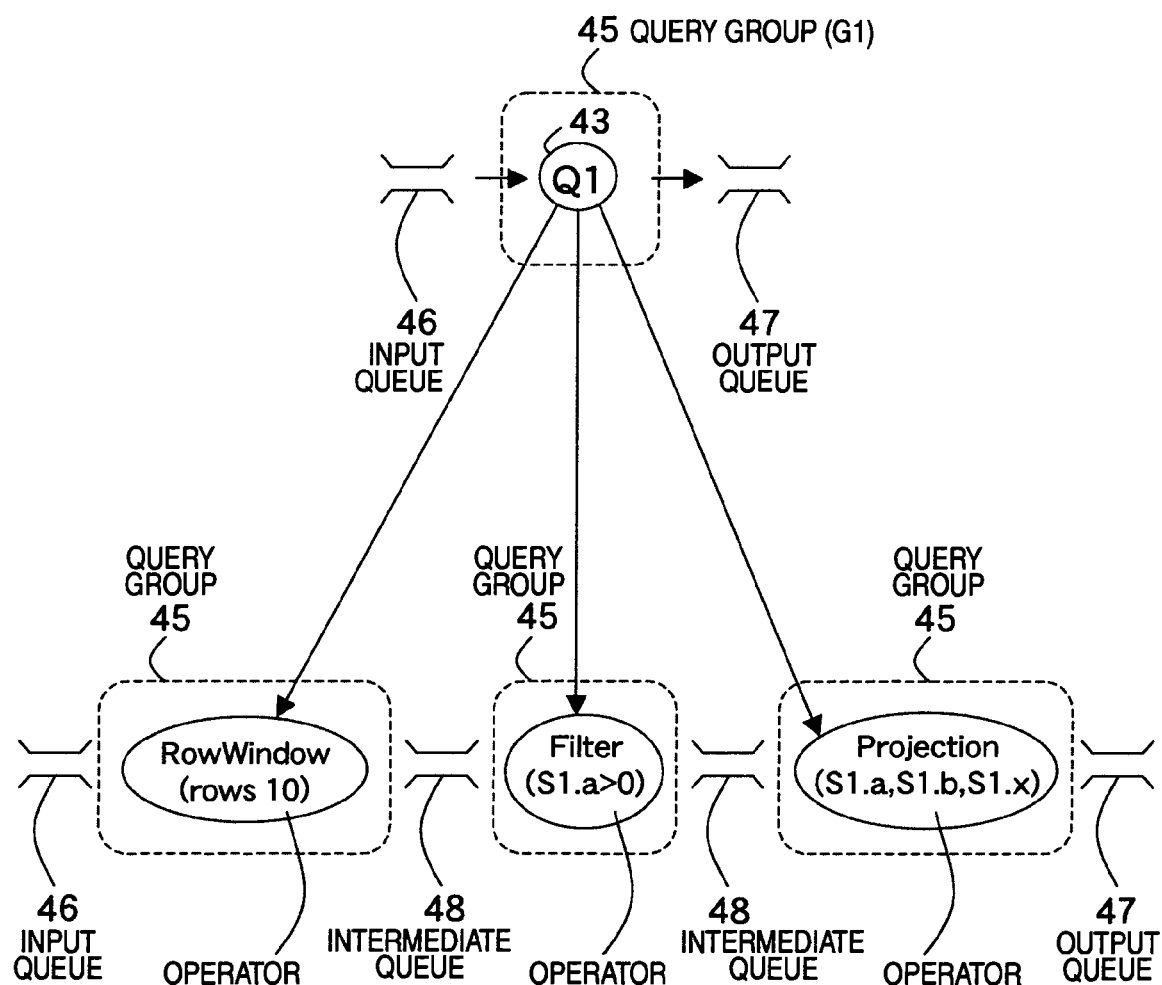
FIG. 5 is an explanatory diagram showing a query divided into a plurality of query groups according to the embodiment of the invention.

FIG. 5 is an explanatory diagram showing one query 43 divided into a plurality query groups 45. As described in FIGS. 3A-3C, basically, at least one query 43 belongs to each query group 45. However, when, for example, the load of one query 43 is too large, a plurality of operators forming the query 43 may be extracted, and query groups 45 may be assigned by units of the operators.

FIG. 5 shows an example where query groups 45 are assigned respectively to three operators because the query 43 (Q1) in FIGS. 3A-3C is constituted by the three operators.

The operator "RowWindow" designating a window operation corresponds to "from S1 [rows 10]" of the query 43 (Q1).

The operator "Filter" designating a filtering operation for specifying a condition corresponds to "where S1.a>0" of the query 43 (Q1).

The operator "Projection" designating a projection operation corresponds to "select S1.a, S1.b, S1.x" of the query 43 (Q1).

In this manner, when sufficient throughput cannot be obtained by dividing the query group 45 by units of queries 43, query groups 45 can be defined by units of operators so that the throughput can be further improved.

FIGS. 6A and 6B are configuration diagrams of the statistical information table 38. FIG. 6A shows the statistical information table 38 before stagnation of data. FIG. 6B shows the statistical information table 38 during stagnation of data.

The statistical information table 38 manages queries 43, input flow rates, latencies and estimated load values in association with one another.

The "input flow rate" designates the number of input tuples of a corresponding query 43 per unit time. The "input flow rate" is shown in units of [tuples/second].

The "latency" designates the average time of the tuples of the corresponding query 43 from the time when each tuple is inputted to the time when the tuple is outputted. The "latency" is shown in units of [milliseconds]. The "latency" may be set as statistical information of an actually measured value as to the average time of tuples, or may be set as a theoretically estimated value obtained by program analysis of operators of the query 43. When the "input flow rate" of the query 43 is beyond the maximum throughput (reciprocal of "latency") of the query 43, processing of the query 43 cannot catch up with the "input flow rate" of the query 43 so that data overflow occurs.

The "estimated load value" is an estimated value of the load of a corresponding query 43. For example, the "estimated load value" can be calculated by a product of the "input flow rate" and the "latency". The "estimated load value" may be calculated, for example, by the following expressions.

estimated load value="input flow rate"
estimated load value=actually measured value of "latency"
estimated load value=theoretically
estimated value of "latency"

Here, when FIG. 6A is compared with FIG. 6B in terms of the estimated load value, the load estimated value in FIG. 6B is higher. That is, FIG. 6B shows the state of data stagnation.

Figure 7:
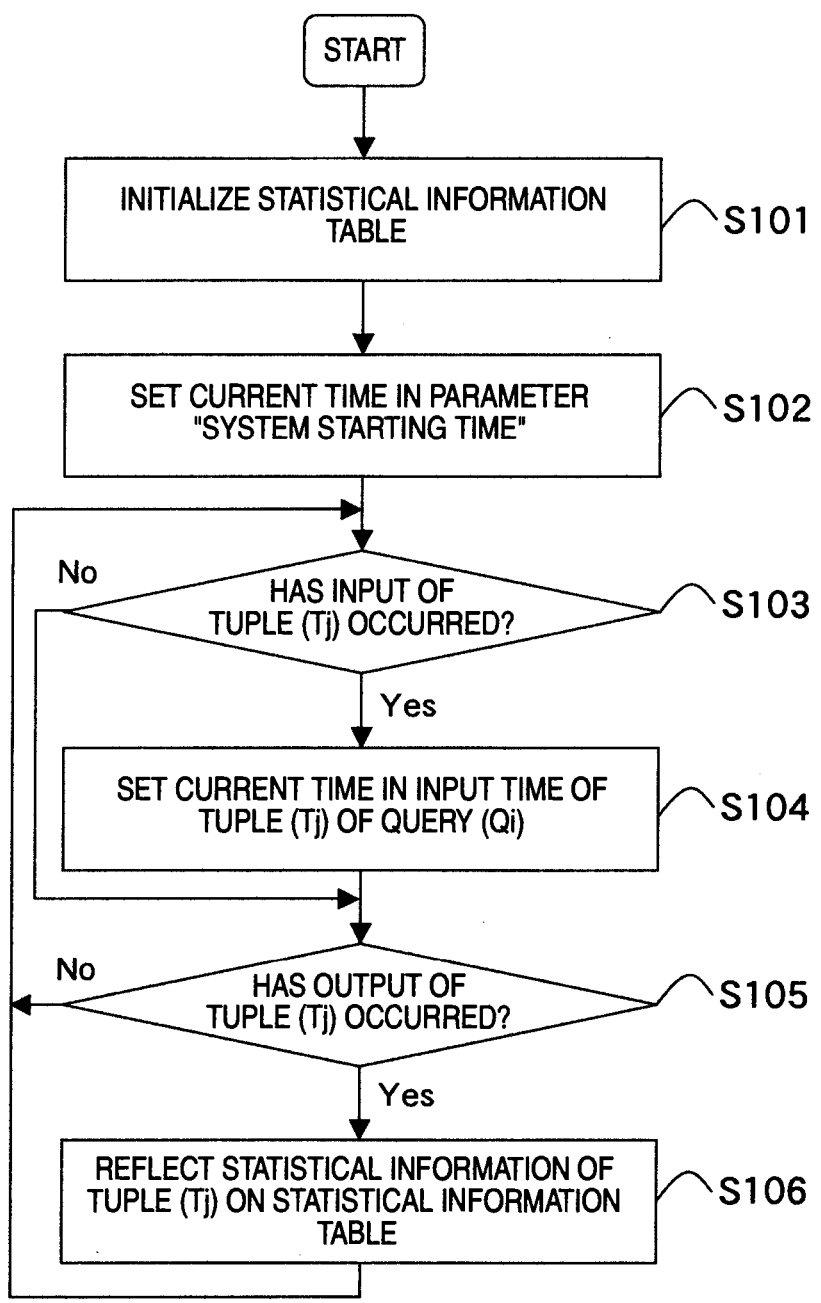
FIG. 7 is a flow chart showing processing for creating the statistical information table, which processing is executed by a statistical information acquisition section, according to the embodiment of the invention.

FIG. 7 is a flow chart showing processing for creating the statistical information table 38, which processing is executed by the statistical information acquisition section 34. The flow chart is executed as soon as the system of the server apparatus 2 is started up.

In S101, the statistical information table 38 is initialized. Specifically, records of the query repository 36 designating the queries 43 respectively are created, and all the strings in the records are set as initial values "0".

In S102, current time is set in a parameter "system starting time".

In S103, it is determined whether an input of a tuple (Tj) has occurred in a query 43 (Qi) in the query execution section 35 or not. When Yes in S103, the processing advances to S104. When No in S103, the processing skips to S105.

In S104, the current time is set in the input time of the tuple (Tj) of the query 43 (Qi).

In S105, it is determined whether an output of the tuple (Tj) has occurred in the query 43 (Qi) in the query execution section 35 or not. When Yes in S105, the processing advances to S106. When No in S105, the processing returns to S103.

In S106, statistical information of the tuple (Tj) is reflected on the statistical information table 38.

Specifically, a value for the tuple (Tj) (value=1) is added to the amount of input data of the query 43 (Qi). Time of processing the tuple (Tj) (current time—"input time of the tuple (Tj) of the query 43 (Qi)") is added to the processing time of the query 43 (Qi).

The values of the string of the query 43 (Qi) in the statistical information table 38 is updated by the following expressions.

input flow rate of query 43 ($Qi$)=amount of input data
of query 43 ($Qi$)/(current time−system starting
time)

latency of query 43 ($Qi$)=processing time of query 43
($Qi$)/amount of input data of query 43 ($Qi$)

Figure 8:
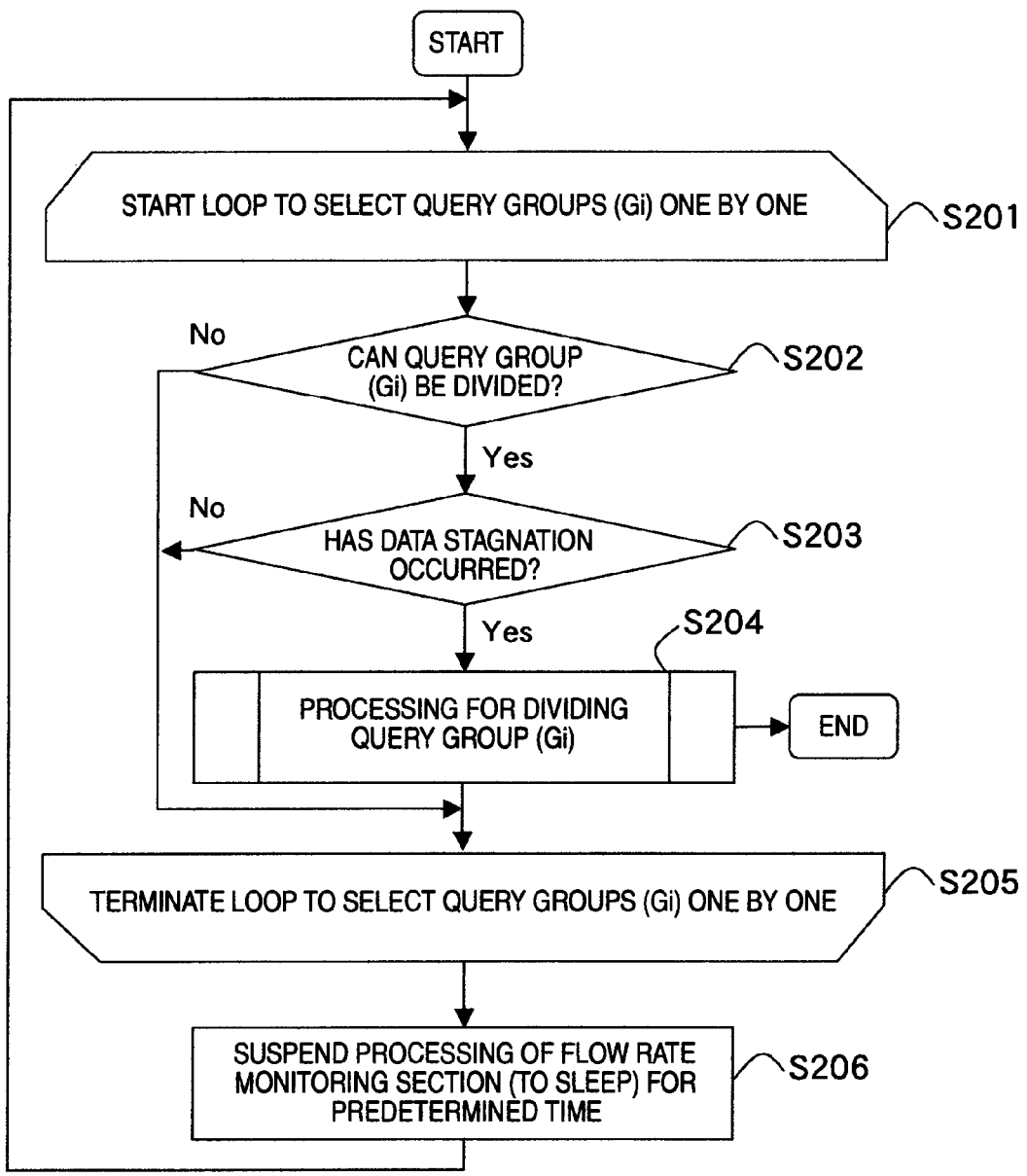
FIG. 8 is a flow chart showing processing for monitoring data stagnation, which processing is executed by a flow rate monitoring section, according to the embodiment of the invention.

FIG. 8 is a flow chart showing processing for monitoring data stagnation, which processing is executed by the flow rate monitoring section 32.

In S201, a loop to select the query groups 45 one by one from the query group management table 37 is started. A query group 45 selected currently will be referred to as a query group 45 (Gi).

In S202, it is determined whether the query group 45 (Gi) is dividable or not. Here, for example, "dividable" may be regarded as the case where two or more queries 43 are included in the query group 45 (Gi) (see FIGS. 3A-3C etc.), or may be regarded as the case where one query 43 is included in the query group 45 (Gi) and two or more operators are included in the query 43 (see FIG. 5 and so on). When Yes in S202, the processing advances to S203. When No in S202, the processing skips to S205.

In S203, it is determined whether data stagnation occurs in the query group 45 (Gi) or not. The method for detecting data stagnation will be described later. When Yes in S203, the processing advances to S204. When No in S203, the processing skips to S205.

Figure 9:
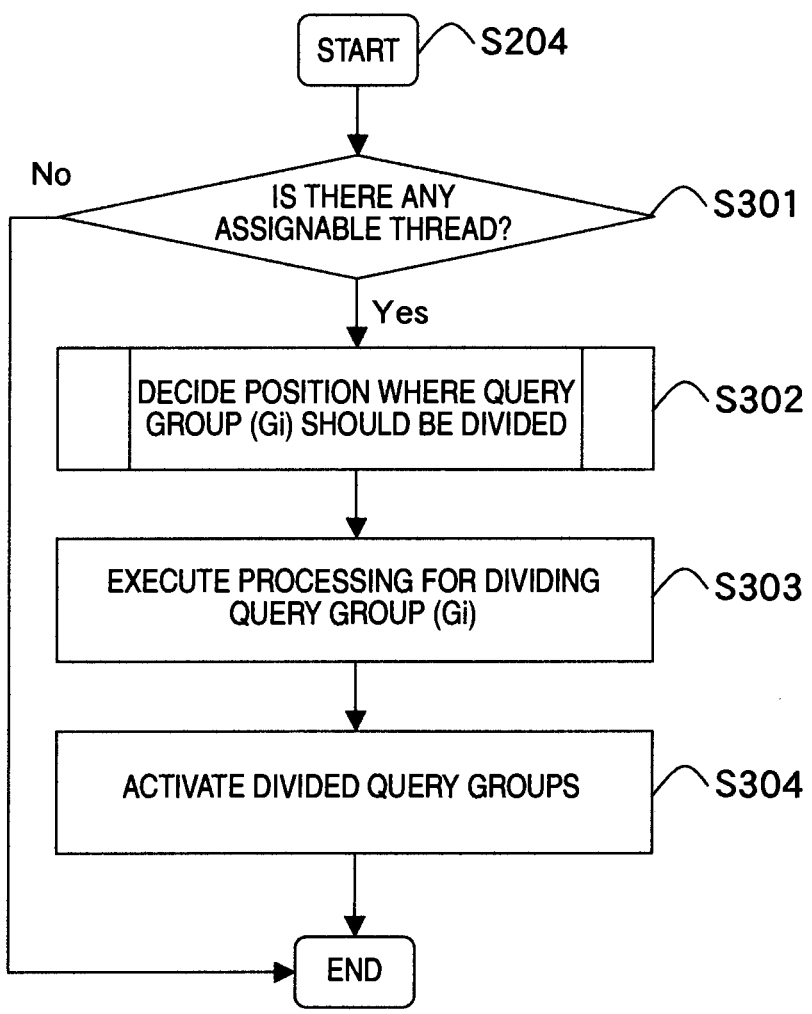
FIG. 9 is a flow chart showing details of processing for dividing a query group, which processing is executed by a scheduler, according to the embodiment of the invention.

In S204, dividing processing to be performed on the query group 45 (Gi) is started up (processing of FIG. 9 is called), and then this flow chart is terminated. S201 of this flow chart is started up again from the started dividing processing.

In S205, the loop processing from S201 is terminated.

In S206, the processing of the flow rate monitoring section 32 is suspended (to sleep) for a predetermined time, and the processing returns to S201. In this manner, the processing for dividing the query group 45 is repeated to divide the query group 45 a required number of times so that suitable throughput can be obtained.

Here, two methods will be described as the method for detecting data stagnation in S203 by way of example. Of those methods, at least one method is used to detect data stagnation of the query group 45 (Gi).

First, the first method is a method for detecting data stagnation based on the statistical information table 38.

An input flow rate X of the query group 45 (Gi) designates an "input flow rate" of a head query 43 in the query group 45 (Gi). For example, in FIG. 6A, the "input flow rate"=40 of the head query 43 (Q1) is set as the input flow rate X.

An average latency Y of the query group 45 (Gi) is obtained as follows. Assume that each query 43 in the query group 45 (Gi) is referred to as a query 43 (Qj). In this case, a value "latency" of query 43 (Qj)×("input flow rate" of query 43 (Qj)/input flow rate X)" is calculated for each query 43 (Qj). A total sum of the values calculated thus is set as the average latency Y. For example, in FIG. 6A, the average latency Y is obtained by the following calculation.

$$10 \times (40/40) + 8 \times (30/40) + 16 \times (30/40) + 4 \times (25/40) + (20/40) =$$

$$31.5 \text{ (milliseconds)}$$

Data stagnation is determined by the expression "input flow rate X>1000/average latency Y". For example, in FIG. 6A, the expression is established as:

(input flow rate $X$=40)>1000/(average latency $Y$=31.5)

Because 40>31.7, it is concluded that data stagnation has occurred.

On the other hand, the second method is a method for detecting data stagnation based on the input queue 46. The number of tuples in the input queue 46 or the intermediate queue 48 located in the input position of the query group 45 (Gi) is counted. When the number of tuples is beyond a predetermined threshold, it may be concluded that "data stagnation has occurred".

FIG. 9 is a flow chart showing details of the dividing processing to be executed on the query group 45 (Gi) by the scheduler 33.

In S301, it is determined whether there is any assignable thread or not. When there is any assignable thread, it means that, for example, the number of available threads (CPUs) is larger than the number of assigned threads. When Yes in S301, the processing advances to S302. When No in S301, the processing is terminated.

Figure 10:
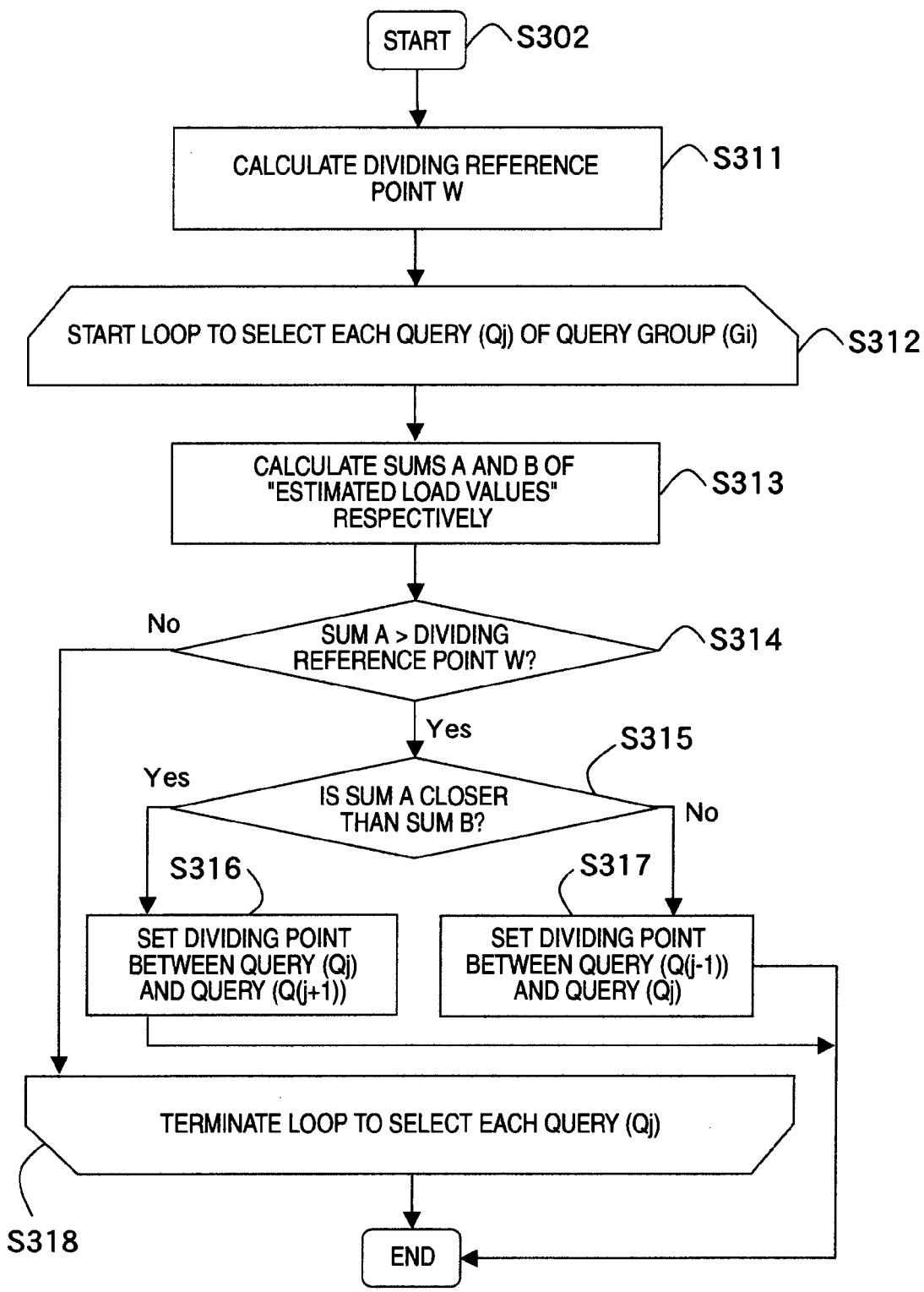
FIG. 10 is a flow chart showing processing for deciding positions where the query group should be divided, which processing is executed by the scheduler, according to the embodiment of the invention.

In S302, processing of FIG. 10 is called to decide the position where the query group 45 (Gi) should be divided.

In S303, processing for dividing the query group 45 (Gi) is executed. Specifically, the following procedure is executed.

(1) Data input to the query group 45 from a queue (input queue 46 or intermediate queue 48) located in the input position of the query group 45 (Gi) which has not yet been divided is stopped.

(2) Execution of query arithmetic processing is suspended till all the data being processed in the query group 45 (Gi) which has not yet been divided are outputted to a queue (output queue 47 or intermediate queue 48) located in the output position of the query group 45 (Gi).

(3) One query group 45 (Gi) is divided into two query groups 45 in accordance with the dividing position decided in S302. The first divided query group 45 includes any one of the queries 43 of the query group 45 (Gi) located ahead of the dividing position. The second divided query group 45 includes any one of the queries 43 of the query group 45 (Gi) located behind the dividing position.

(4) The first and second divided query groups 45 are connected through an intermediate queue 48.

(5) The same thread for the query group 45 (Gi) which has not yet been divided is assigned to the first query group 45, and another new thread is assigned to the second query group 45.

In S304, the divided query groups 45 are activated. To this end, processing of the flow rate monitoring section 32 (FIG. 8) is first started up again. Next, of records on the statistical information table 38, records for the query group 45 which has not yet been divided are deleted, while records for the divided query groups 45 are created newly, and the values of strings thereof are initialized and filled with 0. Further, data input suspended in the step (1) in the procedure of S303 is resumed.

FIG. 10 is a flow chart showing processing for deciding the position where the query group 45 (Gi) should be divided, which processing is executed by the scheduler 33.

In S311, a dividing reference point W is calculated. Specifically, the "estimated load values" of the queries 43 forming the query group 45 (Gi) are acquired from the statistical information table 38, and the total sum thereof is set as the "estimated load value" of the query group 45 (Gi). A value obtained by dividing the "estimated load value" by 2 is set as the dividing reference point W.

In S312, a loop to select the queries 43 forming the query group 45 (Gi) sequentially one by one from the head query 43 is started. Assume that a query 43 (Qj) designates the query 43 selected for the j-th time in this loop.

In S313, sums A and B of "estimated load values" are calculated.

sum A of "estimated load values"=total sum of "estimated load values" of queries 43 from the head query 43 of the query group 45 (Gi) to the query 43 (Qj) thereof sum B of "estimated load values"=total sum of "estimated load values" of queries 43 from the head query 43 of the query group 45 (Gi) to the query 43 (Q(j−1)) thereof.

In S314, it is determined whether the sum A of "estimated load values" is larger than the dividing reference point W or not. When Yes in S314, the processing advances to S315. When No in S314, the processing skips to S318.

In S315, it is determined whether the sum A of "estimated load values" is closer to the dividing reference point W than the sum B of "estimated load values" or not. Specifically, a distance between each sum of "estimated load values" and the dividing reference point W is obtained. When Yes in S315, the processing advances to S316. When No in S315, the processing skips to S317.

In S316, a dividing point is set between the query 43 (Qj) and the query 43 (Q(j+1)).

In S317, a dividing point is set between the query 43 (Qj) and the query 43 (Q(j−1)).

In S318, the loop from S312 is terminated.

According to the processing for dividing a dividing position as described above, in the statistical information table 38 of FIG. 6A, the query group 45 can be divided into substantially equal two at the dividing position expressed by:

first query group 45 (Q1,Q2)=sum of "estimated load values" is "640"

second query group 45 (Q3,Q4,Q5)=sum of "estimated load values" is "620"

According to this embodiment described above, upon reception of a notification of data stagnation occurring in a given query group 45, the scheduler 33 divides the given query group 45 into two query groups 45 substantially equal in processing times, and reallocates the query groups 45 to different threads respectively. As a result, input stream data are processed in parallel in accordance with the divided query groups 45 so that the throughput can be improved.

The query group 45 to be divided may be a query group 45 which has been divided before. Thus, the query group 45 with a high load is divided into query groups 45 with suitable granularity by one or more dividing processings.

Further, in the scheduler 33, the processing for dividing the query group 45 can be triggered by occurrence of data stagnation in the query group 45. As a result, dividing the query group 45 can be suppressed when the query group 45 can be processed sufficiently relative to the data input rate arriving there. Thus, the influence on processing speed and use resources can be kept minimal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stream data processing method carried out by a stream data processing apparatus for accepting stream data inputted continuously and executing query arithmetic processing on the stream data, wherein:
the stream data processing apparatus includes:
a storage configured to store the stream data;
a stream control section configured to control the stream data processing apparatus;
a query execution section configured to execute the query arithmetic processing on the stream data; and
a scheduler configured to allocate computer resources of the stream data processing apparatus, and
the scheduler is configured to perform the steps of:
grouping one or more queries defining the query arithmetic processing as a first query group;
allocating the first query group as one unit to a thread of the computer resources to make the query execution section execute the query arithmetic processing on the first query group;
reading input flow rates and latencies of one or more queries of a second query group from the storage; and
monitoring data stagnation in the second query group;
when data stagnation is detected in the second query group as an input flow rate of the stream data to the second query group exceeding an average value of processing flow rate of the one or more queries of the second query group based on the input flow rate of the stream data, and the input flow rates and the latencies of the one or more queries of the second query group, the scheduler is further configured to perform the steps of:
calculating estimated load values of each of the one or more queries of the second query group as products of the input flow rates and the latencies of the respective one or more queries of the second query group;
dividing queries belonging to the second query group into a third query group and a fourth query group so that the sum of estimated load values of queries of the third query group can be substantially equalized to the sum of estimated load value of queries of the fourth query group; and
giving an instruction to the stream control section to reallocate the third query group and the fourth query group to different threads of the computer resource respectively.

2. A stream data processing method according to claim 1, wherein:
the scheduler is configured to omit the processing for dividing the given query group into a plurality of query groups when the number of allocated threads of threads of the computer resources of the stream data processing apparatus is equal to the number of available threads.

3. A stream data processing method according to claim 1, wherein:
when the scheduler groups one or more queries defining the query arithmetic processing as a query group, the scheduler is configured to group operators, which are constituent elements of the queries, as the query group.

4. A non-transitory computer readable medium therein an application program, which, when executed, causes a stream data processing apparatus to execute a stream data process method:
wherein the stream data processing apparatus includes:
a storage configured to store the stream data;
a stream control section configured to control the stream data processing apparatus;
a query execution section configured to execute the query arithmetic processing on the stream data; and
a scheduler configured to allocate computer resources of the stream data processing apparatus, and
the stream data processing method comprises:
grouping, using the scheduler, one or more queries defining the query arithmetic processing as a first query group;
allocating, using the scheduler, the first query group as one unit to a thread of the computer resources to make the query execution section execute the query arithmetic processing on the first query group;
reading, using the scheduler, input flow rates and latencies of one or more queries of a second query group from the storage; and
monitoring, using the scheduler, data stagnation in the second query group;
when data stagnation is detected in the second query group as an input flow rate of the stream data to the second query group exceeding an average value of processing flow rates of the one or more queries of the second query group based on the input flow rate of the stream data, and the input flow rates and the latencies of the one or more queries of the second query group, the stream data processing method further comprises:
calculating, using the scheduler, estimated load values of each of the one or more queries of the second query group as products of the input flow rates and the latencies of the respective one or more queries of the second query group;

dividing, using the scheduler, queries belonging to the second query group into a third query group and a fourth query group so that the sum of estimated load values of queries of the third query group can be substantially equalized to the sum of estimated load values of queries of the fourth query group; and giving, using the scheduler, an instruction to the stream control section to reallocate the third query group and the fourth query group to different threads of the computer resources respectively.

5. A stream data processing apparatus for accepting stream data inputted continuously and executing query arithmetic processing on the stream data, the stream data processing apparatus comprising:

a storage configured to store the stream data;

a stream control section configured to control the stream data processing apparatus;

a query execution section configured to execute the query arithmetic processing on the stream data; and a scheduler configured to allocate computer resources of the stream data processing apparatus;

wherein the scheduler is configured to group one or more queries defining the query arithmetic processing as a first query group;

allocate the first query group as one unit to a thread of the computer resources to make the query execution section execute the query arithmetic processing on the first query group;

read input flow rates and latencies of one or more queries of a second query group from the storage; and monitor data stagnation in the second query group;

when data stagnation is detected in the second query group as an input flow rate of the stream data to the second query group exceeding an average value of processing flow rates of the one or more queries of the second query group based on the input flow rate of the stream data, and the input flow rates and the latencies of the one or more queries of the second query group, the schedule is further configured to:

calculate estimated load values of each of the one or more queries of the second query group as products of the input flow rates and the latencies of the respective one or more queries of the second query group;

divide queries belonging to the second query group into a third query group and a fourth query group so that the sum of estimated load values of queries of the third query group can be substantially equalized to the sum of estimated load values of queries of the fourth query group; and give an instruction to the stream control section to reallocate the third query group and the fourth query group to different threads of the computer resources respectively.

* * * * *